(12) United States Patent
Wandel

(10) Patent No.: US 8,078,168 B2
(45) Date of Patent: *Dec. 13, 2011

(54) SCANNING AND DECODING METHODS AND APPARATUS FOR MOBILE COMMUNICATION DEVICES

(75) Inventor: Matthias Wandel, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/703,976

(22) Filed: Feb. 11, 2010

(65) Prior Publication Data

US 2010/0144348 A1 Jun. 10, 2010

Related U.S. Application Data

(63) Continuation of application No. 11/280,686, filed on Nov. 16, 2005, now Pat. No. 7,689,216.

(51) Int. Cl.
*H04W 4/00* (2009.01)
(52) U.S. Cl. .................. 455/434; 455/160.1; 455/154.2; 455/161.1; 370/331; 370/230; 370/231; 370/233; 370/234; 370/235; 370/237; 370/232; 370/360; 709/240; 709/235; 710/29
(58) Field of Classification Search .............. 455/160.1, 455/154.2, 161.1, 543, 434; 370/331, 230, 370/231, 233, 234, 235, 237, 232, 360, 385.2; 709/240, 235; 710/29
See application file for complete search history.

(56) References Cited

U.S. PATENT DOCUMENTS

| | | | |
|---|---|---|---|
| 5,451,839 A | 9/1995 | Rappaport et al. | |
| 6,205,334 B1 | 3/2001 | Dent | |
| 7,031,665 B1 | 4/2006 | Trell | |
| 7,062,282 B2 | 6/2006 | Liu et al. | |
| 7,236,746 B2 | 6/2007 | Peric | |
| 2004/0264413 A1 | 12/2004 | Kaider et al. | |
| 2005/0009523 A1 | 1/2005 | Pekonen | |
| 2005/0101323 A1* | 5/2005 | De Beer | 455/435.2 |
| 2005/0180351 A1 | 8/2005 | Peric | |
| 2005/0286547 A1 | 12/2005 | Baum et al. | |
| 2006/0209762 A1 | 9/2006 | Talmola et al. | |
| 2007/0091839 A1 | 4/2007 | Abdelhamid et al. | |

FOREIGN PATENT DOCUMENTS

WO 0031998 A1 6/2000

OTHER PUBLICATIONS

Extended European search report of Mar. 17, 2006 for European patent application having application No. 05257076.9.

* cited by examiner

*Primary Examiner* — Nimesh Patel

(74) *Attorney, Agent, or Firm* — John J. Oskorep, Esq.

(57) ABSTRACT

For each broadcast control channel of a plurality of broadcast control channels associated with a plurality of wireless networks, a mobile device decodes control information on the broadcast control channel and stores this control information in its memory. The control information includes a network identification which uniquely identifies a particular wireless communication network. Such decoding is performed in between or during repeated acts of measuring signal strength levels of an RF signal on the broadcast control channel, and prior to completion of an averaging function for calculating an averaged signal strength level of the signal strength levels on the broadcast control channel. Decoding may be performed only for those broadcast control channels identified to have the most optimal signal strengths. The mobile device performs a network selection technique for selecting one of the wireless networks based on the one or more stored network identifications that were decoded and stored prior to completion of the averaging functions, which may result in more expedient network selection.

17 Claims, 6 Drawing Sheets

FIG. 1
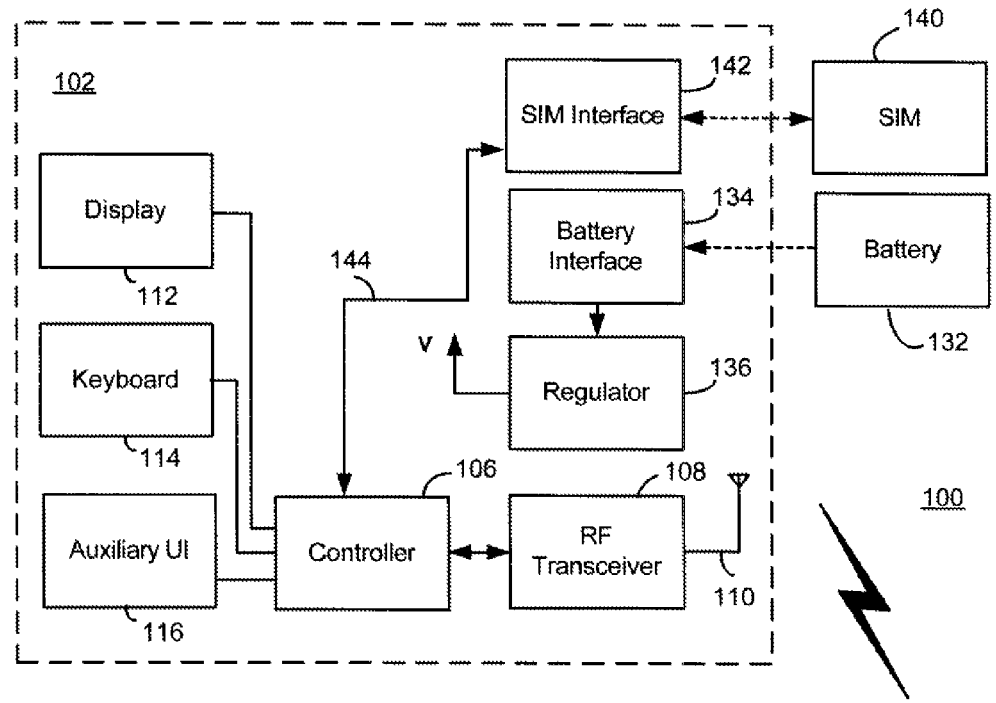
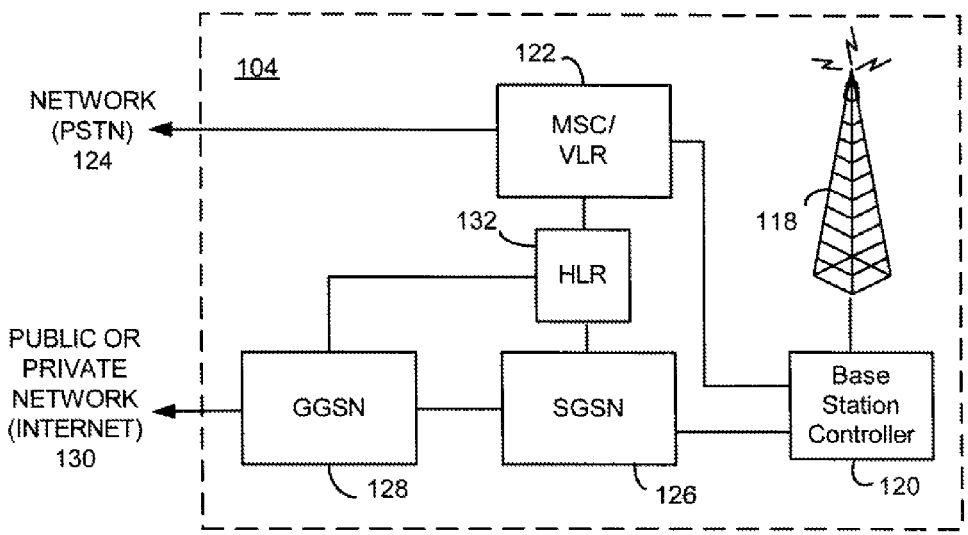

SCANNING AND DECODING METHODS AND APPARATUS FOR MOBILE COMMUNICATION DEVICES

CROSS-REFERENCE TO RELATED APPLICATION

The present application is a continuation of and claims priority to U.S. non-provisional patent application having application Ser. No. 11/280,686 and filing date of 16 Nov. 2005, now U.S. Pat. No. 7,689,216 B2, which is hereby incorporated by reference herein.

BACKGROUND

1. Field of the Technology

The present application relates generally to mobile stations which utilize scanning techniques in order to identify one or more wireless communication networks within which to communicate.

2. Description of the Related Art

Before wireless communications may take for a mobile station in a Global System for Mobile Communications (GSM) wireless network, the mobile station must identify one or more available wireless networks in its coverage area and select one of them for communication. To do this, the mobile station causes a scanning procedure to be performed to identify one or more radio frequency (RF) signals within its coverage area. Each RF signal is associated with one of the wireless networks within which the mobile station may be able to operate. Optimal RF signals are generally those RF signals which have been identified to have the best RF signal strengths for communication.

For each optimal RF signal, the mobile station decodes system control information over a broadcast control channel (BCCH). The system control information includes network identification information (e.g. a Mobile Country Code (MCC) and a Mobile Network Code (MNC)) associated with the wireless network and is utilized by the mobile station for selecting the most appropriate wireless network for communication. The mobile station registers and obtains service through the selected wireless network, so that communications through the selected wireless network may proceed.

The signal strength level which is obtained for each RF signal is actually an averaged signal strength value which is based on a plurality of signal strength measurements of the RF signal taken over a time period. In GSM/GPRS communication systems, for example, it is required to take five measurement samples of the signal strength level of each RF signal over a period of five seconds (generally one sample per second) and complete the averaged signal strength value based on these five measurement samples. After the averaged signal strengths of the RF signals are calculated, the mobile station decodes the control information on each control channel associated with the optimal RF signals which have optimal averaged signal strengths.

There is a need for improved scanning and decoding methods and apparatus which will result in obtaining control information (e.g. network identification information) of wireless communication networks in a reduced amount of time.

BRIEF DESCRIPTION OF THE DRAWINGS

Embodiments of present application will now be described by way of example with reference to attached figures, wherein:

FIG. 1 is a block diagram which illustrates pertinent components of a mobile station and a wireless communication network;

DETAILED DESCRIPTION OF THE PREFERRED EMBODIMENTS

Figure 2:
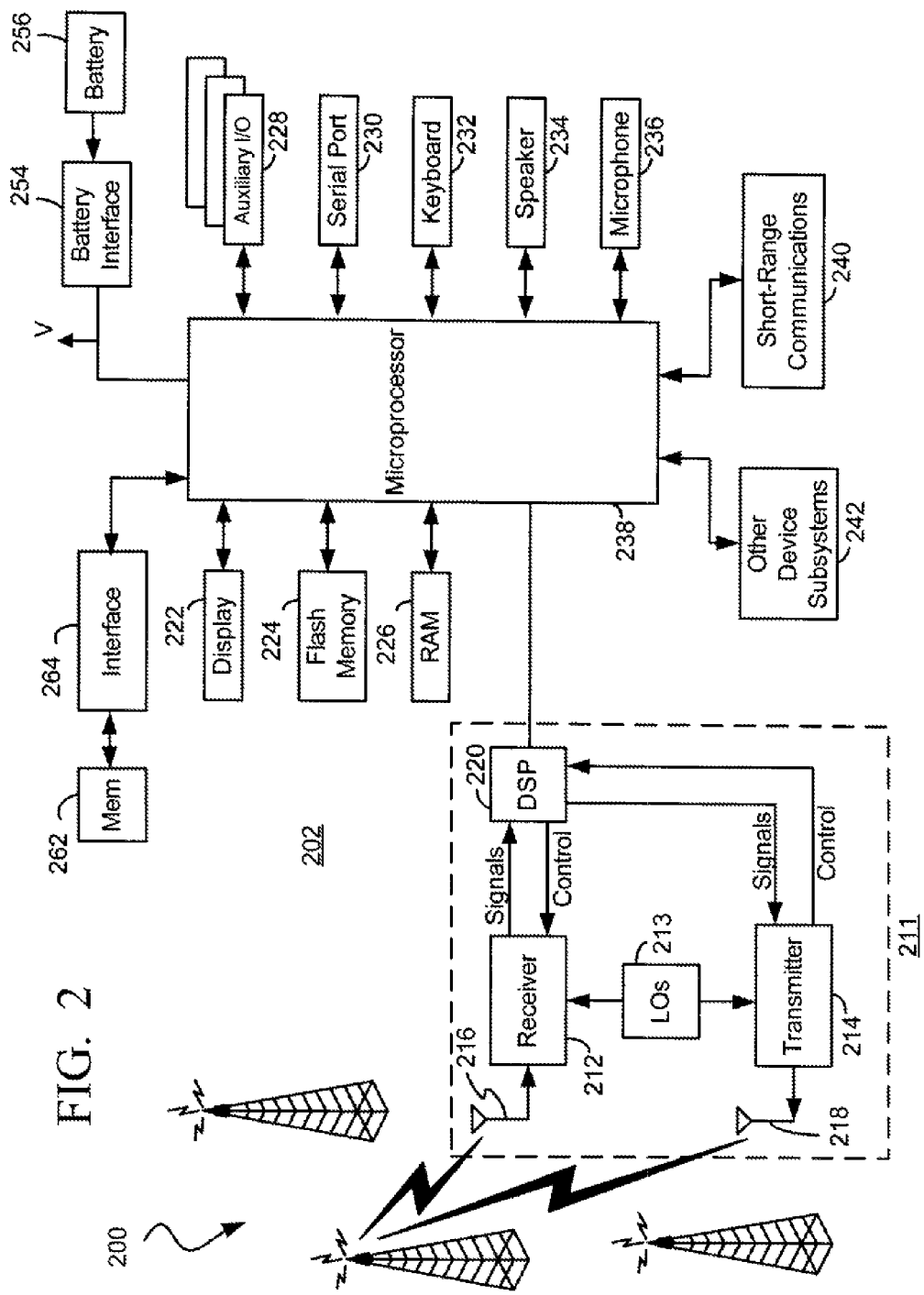
FIG. 2 is a more detailed diagram of a preferred mobile station of FIG. 1.

Scanning and decoding methods and apparatus for mobile communication devices are described herein. The nature of the present techniques involves decoding system information over radio frequency (RF) channels in between the successive iterations of obtaining power levels for all of the RF channels under consideration before all sets of signal strength measurements have been obtained. The selection of which RF channels are the strongest for decoding is done speculatively throughout the procedure based on the current subset of measurements performed, rather than waiting until all sets of measurements to have been obtained. Should these speculative guesses as to which RF channels will be the strongest ones prove to be correct by the time all sets of measurements are taken, the mobile station will already have decoded the appropriate system information for processing. Should the speculative guesses prove to be incorrect, the mobile station may discard the measurements and switch to stronger RF channels for measurement and subsequent decoding. In this manner, a mobile station is able to interleave the reading of system information from the strongest RF channels with the actual measurement of signal strength of all channels under consideration throughout the procedure, resulting in a reduced time required to find and identify the strongest wireless networks in a given area.

FIG. 1 is a block diagram of a communication system 100 which includes a mobile station 102 (one example of a wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202 of the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. The scanning technique of the present application is generally controlled by microprocessor 238 in connection with DSP 220. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information. The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component which provides for communication between mobile station 202 and different systems or devices, which need not necessarily be similar devices.

Figure 3:
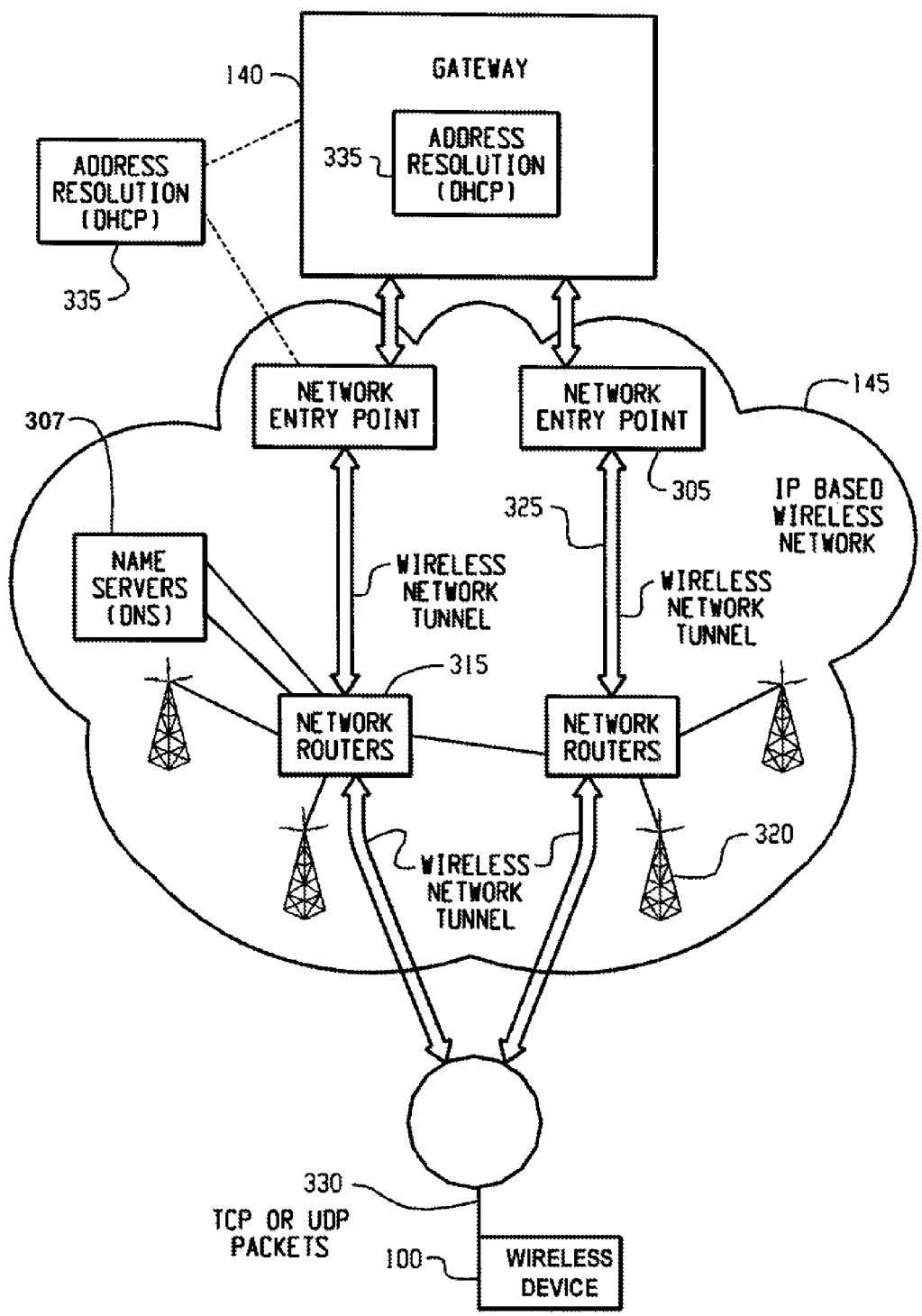
FIG. 3 is a particular system diagram for the mobile station and wireless network of FIGS. 1 and 2.

FIG. 3 shows a particular system structure for communicating with a mobile station. In particular, FIG. 3 shows basic components of an IP-based wireless data network which may be utilized. A mobile station 100 communicates with a wireless packet data network 145, and may also be capable of communicating with a wireless voice network (not shown).

As shown in FIG. 3, a gateway 140 may be coupled to an internal or external address resolution component 335 and one or more network entry points 305. Data packets are transmitted from gateway 140, which is source of information to be transmitted to mobile station 100, through network 145 by setting up a wireless network tunnel 325 from gateway 140 to mobile station 100. In order to create this wireless tunnel 325, a unique network address is associated with mobile station 100. In an IP-based wireless network, however, network addresses are typically not permanently assigned to a particular mobile station 100 but instead are dynamically allocated on an as-needed basis. It is thus preferable for mobile station 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile stations such as mobile station 100.

Wireless network tunnels such as a wireless tunnel 325 are opened across wireless network 345 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 100 must use a specific technique associated with wireless network 345. The step of opening such a wireless tunnel 325 may require mobile station 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 100 and communicated to gateway 140, information can then be forwarded from gateway 140 to mobile station 100.

Figure 4:
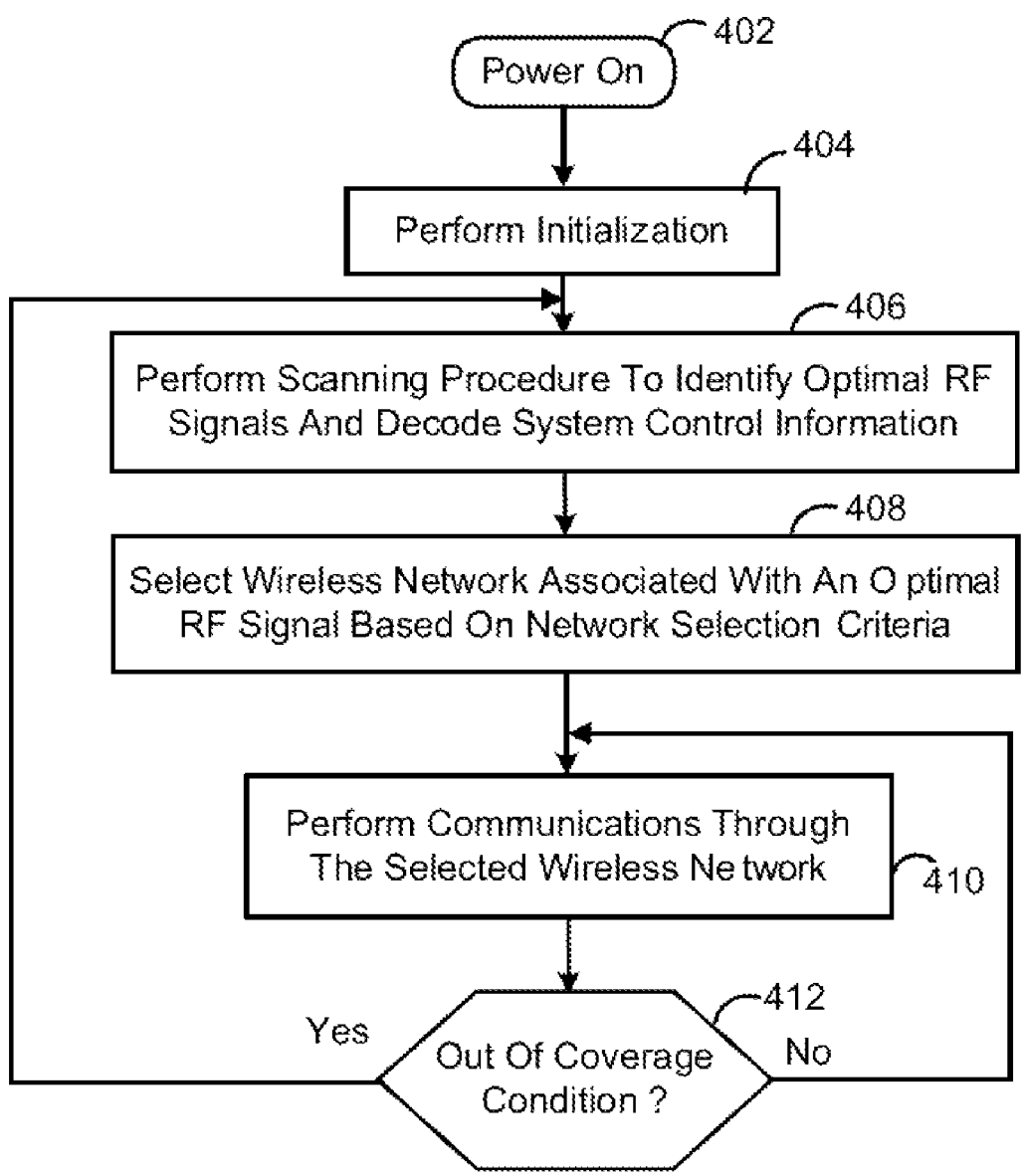
FIG. 4 is a flowchart which describes a general method of operation for the mobile station.

FIG. 4 is a flowchart which describes a general method of operation for the mobile station for network selection. The mobile station is powered-on at a start block 402 of FIG. 4. After power-on, the processor of the mobile station causes initialization procedures to be performed (step 404 of FIG. 4). After initialization procedures are completed, the processor causes a scanning procedure to be performed to identify one or more optimal radio frequency (RF) signals within a coverage area of the mobile station (step 406 of FIG. 4). Also in step 406, system control information is decoded on control channels associated with these optimal RF signals and saved in memory. Optimal RF signals are generally those RF signals which have been identified by the mobile station to have the best RE signal strengths for communication. Each optimal RF signal is associated with one of a plurality of wireless communication networks within which the mobile station may be able to operate. Each of these wireless networks is identifiable by network identification information, which is part of the system control information broadcasted by the wireless network on its control channel.

After the optimal RF signals are identified and the system control information is decoded by the mobile station, the processor selects one of the wireless networks associated with an optimal RF signal for communication based on predetermined network selection criteria (step 408 of FIG. 4). The predetermined network selection criteria may general indicate, for example, that the "home" communication network be selected or, if the home network is unavailable, a preferred communication network be selected (e.g. where the preferred networks are indicated in a prestored network list (e.g. in SIM) or based on predetermined available services offered for the mobile station). The mobile station then registers and obtains service through this selected wireless network, and communications through the wireless network may then proceed (step 410 of FIG. 4). Note that the mobile station may reperform the procedure beginning again at step 406 in response to particular conditions, such as an out-of-coverage condition where RF coverage between the mobile station and the wireless network is lost (step 412 of FIG. 4).

Figure 5:
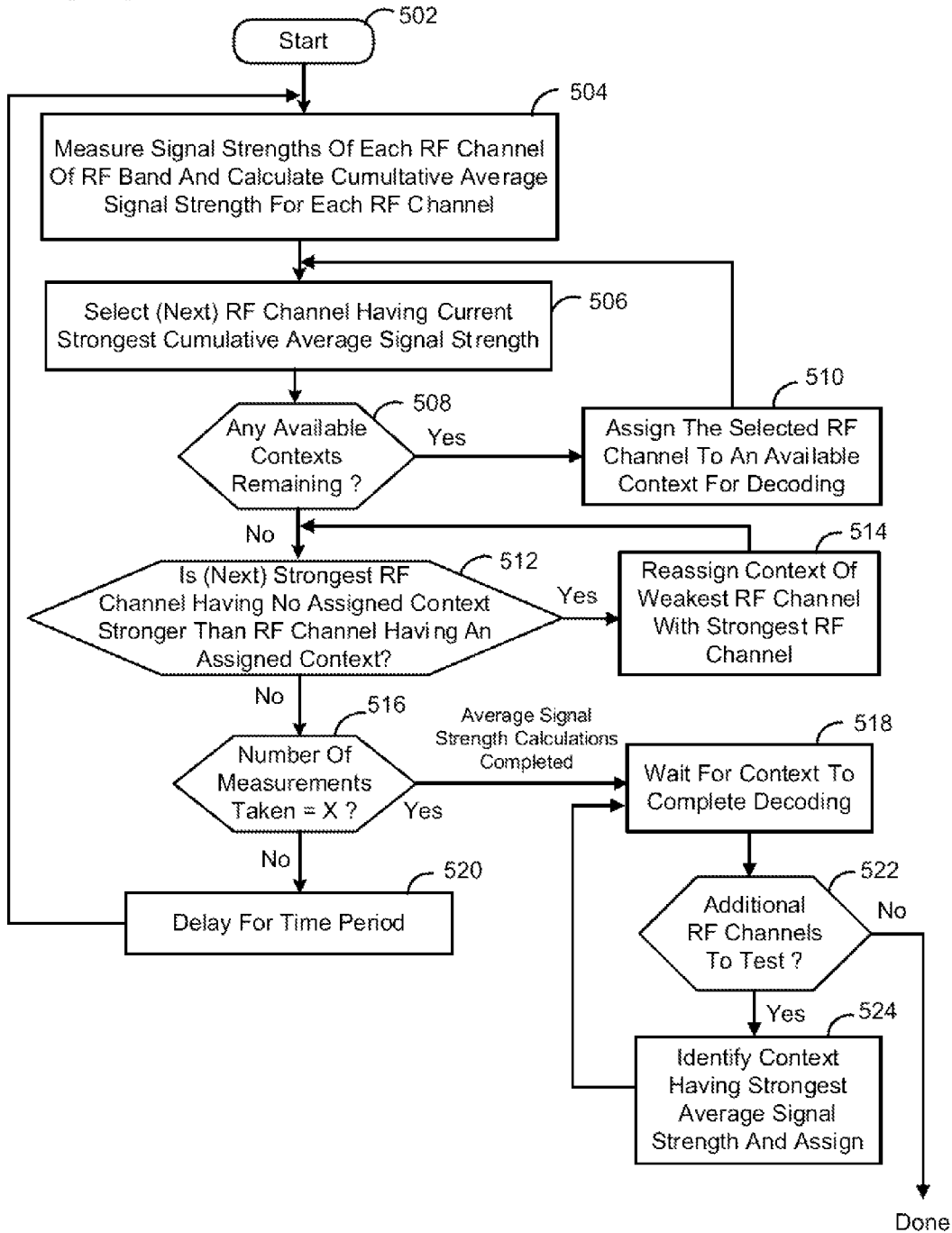
FIGS. 5 and 6 are flowcharts which help describe a scanning and decoding method for the mobile station.

FIG. 5 is a flowchart which describes a scanning and decoding method for the mobile station for use in the present application, which is closely associated with the technique utilized in step 406 of FIG. 4. The mobile station which performs this method includes at least an RF transceiver, an antenna means coupled to the RF transceiver, and one or more processors coupled to the RF transceiver which executes the steps of the method. A computer program product of the present application includes a storage medium (e.g. memory) and computer program instructions stored in the storage medium which are executable by the one or more processors of the mobile station to perform the steps of the method.

Beginning at a start block 502 of FIG. 5, the mobile station initiates a scanning procedure for scanning a plurality of RF channels of at least one RF band associated with the system. A plurality of signal strength levels for a plurality of RF channels of the RF band are measured and identified (step 504 of FIG. 5). In step 504, a cumulative average signal strength level for each of these RF channels is also calculated using an averaging function and these values stored in memory in a list. The processor then identifies and selects the RF channel having the current strongest cumulative average signal strength (step 506 of FIG. 5). If there are available software "contexts" for use (step 508 of FIG. 5), then the processor causes a context to be assigned and activated for the RF channel that is associated with the current strongest cumulative average signal strength (step 510 of FIG. 5). Each new context operates independently and asynchronously with respect to the steps of the flowchart of FIG. 5. The operation of a context is described later in relation to FIG. 6. In general, such a context is used for decoding control information over the RF channel. General processing associated with a context for decoding will be described later below in relation to FIG. 6.

After a context is assigned in step 510, steps 506, 508, and 510 are repeated such that the next RF channel having the (next) current strongest cumulative average signal strength is selected and assigned to an available context. These steps 506, 508, and 510 are repeated until all of the available contexts are utilized as identified in step 508. When there are no more available contexts as identified in step 508, the processor identifies whether the RF channel associated with the (next) strongest cumulative average signal strength and having no assigned context is stronger than any RF channels having an assigned context (step 512 of FIG. 5). If true, then the assigned context associated with the weakest RF channel is reassigned to this RF channel associated with this strongest cumulative average signal strength identified in step 512 (step 514 of FIG. 5). The context is discarded irrespective of its state in the flowchart of FIG. 6.

If any context is reassigned in step 514, steps 512 and 514 are repeated so that any assigned contexts may be reassigned to any RF channels having stronger cumulative average signal strengths. As apparent from the steps above, a plurality of contexts will be assigned and initiated for decoding a plurality of different RF channels of the RF band substantially at the same time.

It is required that a plurality of signal strength measurements be taken over a time period in order to complete the calculation of a final averaged signal strength level for the RF signal over the time period. Therefore, the processor identifies whether the number of signal strength measurements taken in step 504 are equal to a predetermined number (step 516 of FIG. 5). For this purpose, the processor may increment/decrement a scanning loop counter each time the scanning loop or operation is performed. If additional measurements are needed as identified in step 516, the processor causes a delay to occur for the time period (step 520 of FIG. 5) before repeating the operation or loop for taking additional measurements beginning again at step 504. Otherwise, if all of the required number of signal strength measurements have been taken as identified in step 516, processing continues to step 518 of FIG. 5.

In GSM/GPRS, the predetermined number of times that the scanning operation or loop is performed is five (5) (i.e. there are 5 signal strength measurements taken). Each scanning operation takes about one (1) second for a total time period of about five (5) seconds for the entire scanning procedure to be completed (i.e. so as to reach step 518). When step 518 of FIG. 5 is reached, the averaging function on all of the signal strength measurements for each RF channel is completed so that the final averaged signal strength level for each RF channel is known.

In step 518, the processor waits for decoding of any context to be completed (step 518 of FIG. 5). When there are additional RF channels having active contexts to test as identified in step 522 of FIG. 5, the process identifies the RF channel associated with the strongest final averaged signal strength level and assigns it as the optimal RF channel (step 524 of FIG. 5). Steps 518, 522, and 524 are then repeated until all contexts are completed, when the RF channel associated with the strongest RF channel is identified and assigned. When there are no additional RF channels having active contexts to test, the flowchart ends as shown.

Figure 6:
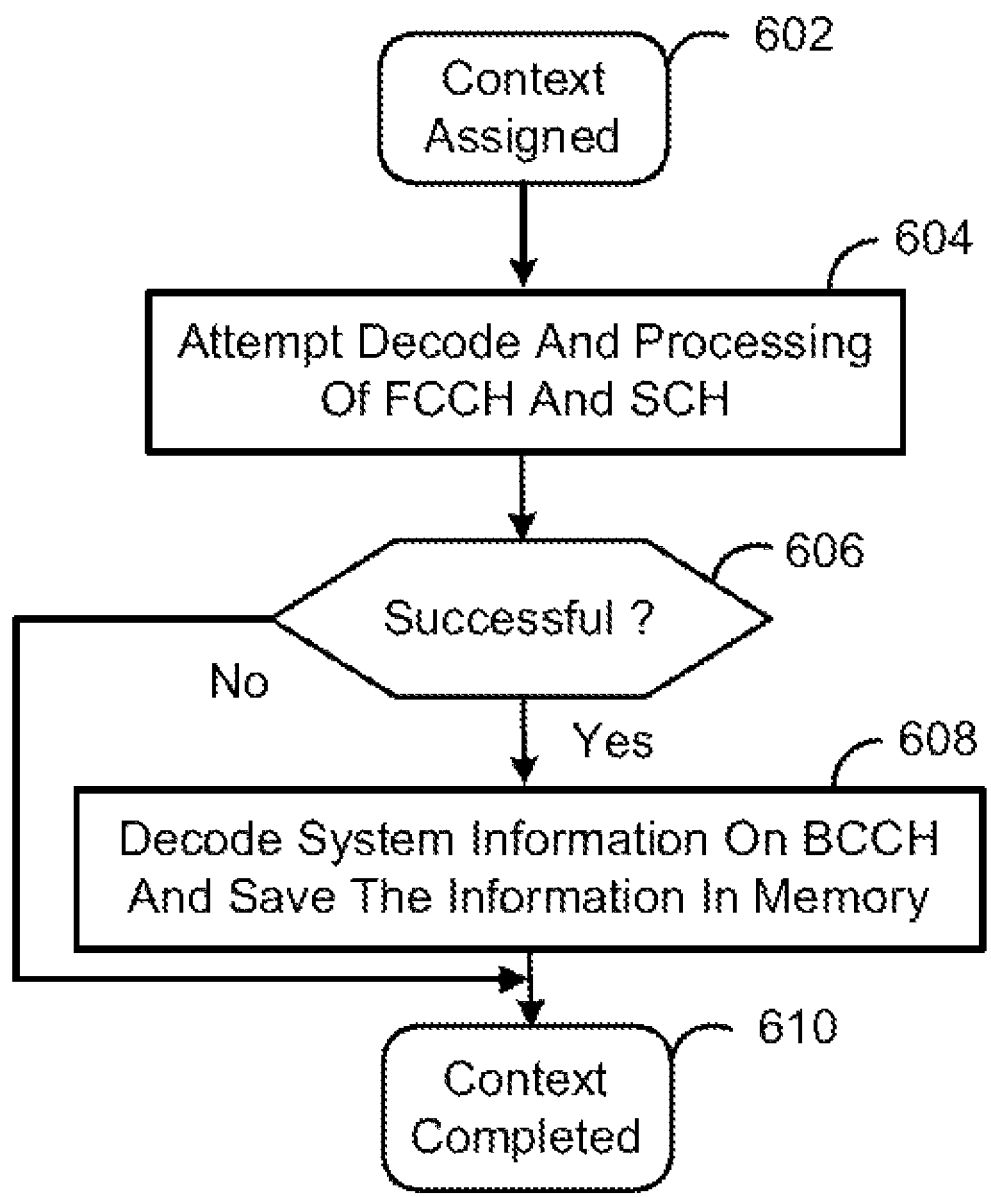

FIG. 6 is a flowchart which describes the general functionality associated with each context assigned for an RF channel which may be activated in the flowchart of FIG. 5. In the flowchart, each context operates independently from other contexts and independently from the steps of the flowchart of FIG. 5 except through steps 510-514.

Beginning at a start block 602 of FIG. 6 where a context is assigned and activated, the processor attempts to decode and process signals on a frequency correction channel (FCCH) and a synchronization channel (SCH) (step 604 of FIG. 6) associated with the RF channel. This is done generally in order to correctly synchronize in frequency and in time with the system. If decoding and processing on the FCCH and SCH is successful as identified in step 606 of FIG. 6, the processor decodes and processes signals on a broadcast control channel (BCCH) associated with the RF channel in order to obtain system control information (step 608 of FIG. 6). The control information includes network identification information such as Mobile Country Code (MCC) and Mobile Network Code (MNC) pairs which uniquely identify each wireless network. After being decoded, the control information is stored in memory of the mobile station in association with an identification of the RF channel. The decoding and saving steps are preferably performed with use of DSP 220, microprocessor 238, and Flash memory 224 of FIG. 2.

Note that the decoding of the control information in step 520 occurs prior to any completion of the final averaged signal strength levels of the RF channels. When the decoding is completed in step 608, or decoding of the FCCH and SCH is unsuccessful in step 606, the context processing is completed (step 610 of FIG. 6). The context is then deassigned, which makes it available for reassignment for subsequent use.

Thus, prior to identifying the optimal RF channel based on the final averaged signal strengths, the control information from the wireless networks is already stored in memory from the previous steps of decoding and saving/storing (i.e. step 608 of FIG. 6). Using and reading this control information stored in the memory (e.g. the network identification information such as MCCs and MNCs), the processor selects one of the wireless communication networks associated with the adequate RF signals based on a predetermined network selection criteria or technique as described earlier in relation to step 408 of FIG. 4. The mobile station then registers and obtains service through this selected wireless network, and communications through the selected wireless network may then proceed as previously described.

As indicated earlier above, the network selection technique of step 408 of FIG. 4 may be based on any suitable technique, such as those conventional or traditional techniques outlined in well-known communication standard documents (e.g. GSM/GPRS standard documents). Using such techniques, the mobile station typically selects a wireless communication network which is identified as its "home" communication network (e.g. HPLMN) if it is available. If the home communication network is unavailable, then the mobile station may select a wireless communication network based on network identification information in a preferred/prioritized network list (e.g. Preferred PLMN list) stored in memory. The preferred network list may be stored in a memory card such as a Subscriber Identity Module (SIM) of the mobile station. If this type of list is utilized, the mobile station typically operates to select the "best" available network, as prioritized in the preferred network list. Alternatively, or additionally, the mobile station may have a network selection technique that is based on other criteria, such as the availability of particular communication services (e.g. data services) offered by the wireless network.

As apparent, it is not necessary for the mobile station to decode the control information for each optimal RF signal just after completion of the final averaged signal strength level. The control information for each RF signal having an optimal RF signal strength has already been decoded and stored in memory by at least one of the multiple running contexts (see FIG. 6) which were assigned in steps 510 and 514 of FIG. 5 for each scanning loop. Since the control information is already saved/stored in memory, the processor of the mobile station may refrain from causing any control information to be subsequently decoded again over the RF channel in response to optimal RF signals being identified based on the final averaged signal strengths. Network selection of step 408 and communications in step 410 may then be achieved more expeditiously. As an option, the mobile station may decode at least some of control information for optimal RF signals as a follow-up to confirm the adequacy or freshness of the control information.

Note further that the technique allows the mobile station to cause control information to be decoded for more than one wireless network during each scanning loop operation. That is, control information may be obtained from two of more wireless communication networks during each scanning loop operation if their cumulative average signal strength levels (identified in step 504 of FIG. 5) are deemed sufficient during the scanning loop time period. Note even further that control information need not be decoded again for RF channels over which control information has already been obtained from a previous scanning loop operation. In fact, it may be preferred that the processor refrains from assigning a context and decoding control information over an RF channel if the control information has already been previously decoded and stored in memory from a previous scanning operation/loop. Also note that the signal strength levels of the RF signals may vary over each of the plurality of scanning loop operations, such that different RF channels may be deemed to be stronger or weaker during different points in time during the time period of the entire scanning procedure. Since different RF signals/RF channels may be deemed to be stronger or weaker over the entire scanning procedure, different sets of control information associated with the different RF signals/RF channels may be obtained. In this case, all control information associated with all RF signals/RF channels may be kept stored in memory at least until the entire scanning procedure is completed, even if any one of the RF signals/RF channels fails to meet the optimal signal strength level criteria for any single scanning loop operation.

Thus, scanning and decoding methods and apparatus for mobile communication devices have been described. In one illustrative method, a signal strength level of an RF signal on an RF channel is measured for a plurality of RF channels of an RF band. The act of measuring a signal strength level is repeated at least one time to obtain at least one other signal strength level of the RF signal. Subsequently, an averaging function is completed with use of the signal strength level and the at least one other signal strength level for identifying an averaged signal strength level of the RF signal. At least one optimal RF signal is then identified based on the averaged signal strength levels of the RF signals on the RF channels. In between the repeated acts of measuring signal strength levels of the RF signals, and prior to identifying the averaged signal strength levels, control information is decoded on at least one of the RF channels and stored in memory. A wireless communication network is selected for communication with use of the control information stored in the memory which corresponds to one of the at least one optimal RF signal. In this manner, the mobile station expeditiously obtains the control information for network selection or other purposes prior to completing the averaging of the signal strength levels. A computer program product of the present application includes a storage medium and computer program instructions stored in the storage medium which are executable by one or more processors for performing the method described above.

A mobile communication device of the present application includes a radio frequency (RF) transceiver, an antenna means coupled to the RF transceiver, and one or more processors coupled to the RF transceiver. The one or more processors are adapted to, for at least some of a plurality of RF channels of an RF band: identify a signal strength level of an RF signal of a wireless communication network on an RF channel; repeat the act of identifying at least one time so that at least one other signal strength level of the RF signal is identified; complete an averaging function with the signal strength level and the at least one other signal strength level for identifying an averaged signal strength level for the RF signal on the RF channel; and in between at least some of the acts of identifying signal strength levels of the RF signal, decode control information on at least one of the RF channels of the RF band and storing the control information in memory.

The above-described embodiments of the present application are intended to be examples only. For example, although the present application describes a technique applicable to a GSM/GPRS network, the technique is also applicable to other networks such as a CDMA or other suitable network. Those of skill in the art may effect alterations; modifications and variations to the particular embodiments without departing from the scope of the application. The invention described herein in the recited claims intends to cover and embrace all suitable changes in technology.

What is claimed is:

1. A network selection method, comprising:
   for each broadcast control channel of a plurality of broadcast control channels associated with a plurality of wireless communication networks:
      measuring, on the broadcast control channel, a signal strength level of a radio frequency (RF) signal of a wireless communication network;
      receiving and decoding control information which is broadcasted on the broadcast control channel and storing the broadcasted control information in memory, the broadcasted control information including a broadcasted network identification which uniquely identifies the wireless communication network;
      repeating the act of measuring on the broadcast control channel at least one time so that at least one other signal strength level of the RF signal on the broadcast control channel is identified;
      completing the averaging function with the signal strength level and the at least one other signal strength level for calculating an averaged signal strength level of the RF signal on the broadcast control channel;
      wherein the acts of receiving, decoding, and storing for said broadcast channel are performed in between the repeated acts of measuring signal strength levels of the RF signal on said broadcast control channel, and prior to completion of the averaging function for calculating the averaged signal strength level; and
   reading the stored broadcasted network identifications that were received, for use in performing a network selection technique for selecting and registering with one of the wireless communication networks corresponding to one of the stored broadcasted network identifications.

2. The network selection method of claim 1, wherein the network selection technique is performed after performing the recited acts for each said broadcast control channel.

3. The network selection method of claim 1, further comprising:
   wherein the averaging function is performed in accordance with Global Systems for Mobile communications (GSM) standards and the broadcasted control information comprises broadcasted control information of a broadcast control channel (BCCH).

4. The network selection method of claim 1, further comprising the acts of:
   prior to the completion of the averaging function for the calculating of the averaged signal strength level of the RF signal on each said broadcast control channel, identifying at least one optimal RF signal from the signal strength levels measured on each said broadcast control channel; and
   wherein the act of decoding comprises decoding the broadcasted control information on the broadcast control channel if the broadcast control channel has the at least one optimal RF signal.

5. The method of claim 1, wherein the broadcasted network identification comprises a mobile network code (MNC) and a mobile country code (MCC) pair.

6. The method of claim 1, wherein the method is performed by a mobile station, the wireless communication network comprises a Global Systems for Mobile communications (GSM) network, and the averaging function is performed on five consecutive measured signal strength levels.

7. A communication device, comprising:
   a radio frequency (RF) transceiver;
   one or more processors coupled to the RF transceiver;
   memory coupled to the one or more processors;
   the one or more processors being operative to:
      for each broadcast control channel of a plurality of broadcast control channels associated with a plurality of wireless communication networks:
         measure, on the broadcast control channel, a signal strength level of an RF signal of a wireless communication network;
         receive and decode control information which is broadcasted on the broadcast control channel and store the broadcasted control information in the memory, the broadcasted control information including a broadcasted network identification which uniquely identifies the wireless communication network;
         repeat the measuring on the broadcast control channel at least one time so that at least one other signal strength level of the RF signal on the broadcast control channel is identified;
         complete an averaging function with the signal strength level and the at least one other signal strength level for calculating an averaged signal strength level of the RF signal on the broadcast control channel;
         wherein the receiving, decoding, and storing for said broadcast channel are performed in between the repeated acts of measuring signal strength levels of the RF signal on said broadcast control channel, and prior to completion of the averaging function for calculating the averaged signal strength level; and
      read the stored broadcasted network identifications that were received, for use in performing a network selection technique for selecting and registering with one of the wireless communication networks corresponding to one of the stored broadcasted network identifications.

8. The communication device of claim 7, wherein the one or more processors are further operative to perform the network selection technique after performing the recited acts for each said broadcast control channel.

9. The communication device of claim 7, wherein the one or more processors are further operative to perform the averaging function in accordance with Global Systems for Mobile communications (GSM) standards and the broadcasted control information comprises broadcasted control information of a broadcast control channel (BCCH).

10. The communication device of claim 7, wherein the one or more processors are further operative to:
prior to the completion of the averaging function for the calculating of the averaged signal strength level of the RF signal on each said broadcast control channel, identify at least one optimal RF signal from the signal strength levels measured on each said broadcast control channel; and
wherein the decoding comprises decoding the broadcast control information on the broadcast control channel if the broadcast control channel has the at least one optimal RF signal.

11. The communication device of claim 7, wherein the broadcasted network identification comprises a mobile network code (MNC) and a mobile country code (MCC) pair.

12. The communication device of claim 7, wherein the wireless communication network comprises a Global Systems for Mobile communications (GSM) network, and the averaging function is performed on five consecutive measured signal strength levels.

13. A computer program product, comprising:
a storage medium;
computer program instructions stored in the storage medium;
the computer program instructions being executable by one or more processors for performing a network selection method by:
for each broadcast control channel of a plurality of broadcast control channels associated with a plurality of wireless communication networks:
measuring, on the broadcast control channel, a signal strength level of a radio frequency (RF) signal of a wireless communication network;
receiving and decoding control information which is broadcasted on the broadcast control channel and storing the broadcasted control information in memory, the broadcasted control information including a broadcasted network identification which uniquely identifies the wireless communication network;
repeating the act of measuring on the broadcast control channel at least one time so that at least one other signal strength level of the RF signal on the broadcast control channel is identified;
completing an averaging function with the signal strength level and the at least one other signal strength level for calculating an averaged signal strength level of the RF signal on the broadcast control channel;
wherein the receiving, decoding, and storing for said broadcast channel are performed in between the repeated acts of measuring signal strength levels of the RF signal on said broadcast control channel, and prior to completion of the averaging function for calculating the averaged signal strength level; and
reading the stored broadcasted network identifications that were received, for use in performing a network selection technique for selecting and registering with one of the wireless communication networks corresponding to one of the stored broadcasted network identifications.

14. The computer program product of claim 13, the computer program instructions being further executable for performing the network selection technique after performing the recited acts for each said broadcast control channel.

15. The computer program product of claim 13, the computer program instructions being further executable for performing the averaging function in accordance with Global Systems for Mobile communications (GSM) standards, the broadcasted control information comprising broadcasted control information of a broadcast control channel (BCCH).

16. The computer program product of claim 13, the computer program instructions being further executable for:
prior to the completion of the averaging function for the calculating of the averaged signal strength level of the RF signal on each said broadcast control channel, identifying at least one optimal RF signal from the signal strength levels measured on each said broadcast control channel; and
wherein the decoding comprises decoding the broadcasted control information on the broadcast control channel if the broadcast control channel has the at least one optimal RF signal.

17. The computer program product of claim 13, wherein the wireless communication network comprises a Global Systems for Mobile communications (GSM) network, and the identifying is performed five times for each said RF signal on each said broadcast control channel.

* * * * *